(12) United States Patent
Hand et al.

(10) Patent No.: US 10,989,257 B2
(45) Date of Patent: Apr. 27, 2021

(54) OVERRUNNING COUPLING AND CONTROL ASSEMBLY AND SYSTEM TO PREVENT THE UNCOMMANDED ENGAGEMENT OF THE ASSEMBLY

(71) Applicant: Means Industries, Inc., Saginaw, MI (US)

(72) Inventors: Joshua D. Hand, Midland, MI (US); Brice A. Pawley, Midland, MI (US)

(73) Assignee: Means Industries, Inc., Saginaw, MI (US)

( * ) Notice: Subject to any disclaimer, the term of this patent is extended or adjusted under 35 U.S.C. 154(b) by 43 days.

(21) Appl. No.: 16/665,150

(22) Filed: Oct. 28, 2019

(65) Prior Publication Data

US 2020/0149597 A1    May 14, 2020

Related U.S. Application Data

(63) Continuation-in-part of application No. 15/866,620, filed on Jan. 10, 2018, now Pat. No. 10,590,998.

(Continued)

(51) Int. Cl.
*F16D 41/16*    (2006.01)
*F16D 48/06*    (2006.01)
(Continued)

(52) U.S. Cl.
CPC ............. *F16D 41/16* (2013.01); *F16D 48/02* (2013.01); *F16D 48/06* (2013.01); *F16D 41/125* (2013.01); *F16D 41/14* (2013.01)

(58) Field of Classification Search
CPC .... F16D 41/12–16; F16D 48/02; F16D 48/06; F16D 48/064
See application file for complete search history.

(56) References Cited

U.S. PATENT DOCUMENTS 2,947,537 A    8/1960  Littell et al.
2,959,062 A    11/1960 Looker
(Continued)

FOREIGN PATENT DOCUMENTS

WO    2018049005 A1    3/2018

OTHER PUBLICATIONS

International Searching Authority, International Search Report and Written Opinion for International Application No. PCT/US2019/60705, dated Jan. 24, 2020.

*Primary Examiner* — Ernesto A Suarez
*Assistant Examiner* — James J Taylor, II
(74) *Attorney, Agent, or Firm* — Brooks Kushman P.C.

(57) ABSTRACT

Overrunning coupling and control assembly and control system for use therein are provided. The system includes a control member mounted for controlled shifting movement between the coupling faces of first and second coupling members. An actuator arm includes an output member and a one-way locking member which is pivotally connected to output member which, in turn, is coupled to the control member. The locking member moves between a disengaged position in which the control member is permitted to shift or rotate relative to the second coupling member and an engaged position with a locking member-engaging portion of the second coupling member to lock the control member and the second coupling member together to prevent the control member from inadvertently shifting in a first direction relative to the second coupling member in the absence of an actuator command signal received by a bi-directional actuator assembly of the system.

25 Claims, 5 Drawing Sheets

Related U.S. Application Data

(60) Provisional application No. 62/758,727, filed on Nov. 12, 2018, provisional application No. 62/510,856, filed on May 25, 2017.

(51) Int. Cl.
*F16D 41/12* (2006.01)
*F16D 41/14* (2006.01)
*F16D 48/02* (2006.01)

(56) References Cited

U.S. PATENT DOCUMENTS

| | | | |
|---|---|---|---|
| 4,050,560 A | 9/1977 | Torstenfelt | |
| 4,340,133 A | 7/1982 | Blersch | |
| 4,651,847 A | 3/1987 | Hermanns | |
| 6,193,038 B1 | 2/2001 | Scott et al. | |
| 6,244,965 B1 | 6/2001 | Klecker et al. | |
| 6,290,044 B1 | 9/2001 | Burgman et al. | |
| 6,568,517 B2 * | 5/2003 | Le-Calve | F16D 41/185 192/45.1 |
| 6,607,292 B2 | 8/2003 | Gutierrez et al. | |
| 6,905,009 B2 | 6/2005 | Reed et al. | |
| 7,198,587 B2 | 4/2007 | Samie et al. | |
| 7,258,214 B2 | 8/2007 | Pawley et al. | |
| 7,275,628 B2 | 10/2007 | Pawley et al. | |
| 7,344,010 B2 | 3/2008 | Fetting, Jr. et al. | |
| 7,464,801 B2 | 12/2008 | Wittkopp | |
| 7,484,605 B2 | 2/2009 | Pawley et al. | |
| 7,491,151 B2 | 2/2009 | Maguire et al. | |
| 7,743,678 B2 | 6/2010 | Wittkopp et al. | |
| 7,766,790 B2 | 8/2010 | Stevenson et al. | |
| 7,942,781 B2 | 5/2011 | Kimes | |
| 7,992,695 B2 | 8/2011 | Wittkopp et al. | |
| 8,051,959 B2 | 11/2011 | Eisengruber | |
| 8,061,496 B2 | 11/2011 | Samie et al. | |
| 8,079,453 B2 | 12/2011 | Kimes | |
| 8,087,502 B2 | 1/2012 | Samie et al. | |
| 8,196,724 B2 | 6/2012 | Samie et al. | |
| 8,272,488 B2 | 9/2012 | Eisengruber et al. | |
| 8,286,772 B2 | 10/2012 | Eisengruber | |
| 8,602,187 B2 | 12/2013 | Prout | |
| 2004/0238306 A1 | 12/2004 | Reed et al. | |
| 2006/0185957 A1 | 8/2006 | Kimes et al. | |
| 2007/0034470 A1 | 2/2007 | Fetting, Jr. et al. | |
| 2007/0278061 A1 | 12/2007 | Wittkopp et al. | |
| 2008/0000747 A1 | 1/2008 | Saka | |
| 2008/0110715 A1 | 5/2008 | Pawley | |
| 2008/0169165 A1 | 7/2008 | Samie et al. | |
| 2008/0169166 A1 | 7/2008 | Wittkopp et al. | |
| 2008/0185253 A1 | 8/2008 | Kimes | |
| 2008/0223681 A1 | 9/2008 | Stevenson et al. | |
| 2009/0159391 A1 | 6/2009 | Eisengruber | |
| 2009/0194381 A1 | 8/2009 | Samie et al. | |
| 2009/0211863 A1 | 8/2009 | Kimes | |
| 2009/0255773 A1 | 10/2009 | Seufert et al. | |
| 2010/0022342 A1 | 1/2010 | Samie et al. | |
| 2010/0230226 A1 | 9/2010 | Prout | |
| 2010/0252384 A1 | 10/2010 | Eisengruber | |
| 2010/0255954 A1 | 10/2010 | Samie et al. | |
| 2011/0177900 A1 | 7/2011 | Simon | |
| 2011/0183806 A1 | 7/2011 | Wittkopp et al. | |
| 2011/0192697 A1 | 8/2011 | Prout et al. | |
| 2012/0090952 A1 | 4/2012 | Lee et al. | |
| 2012/0145505 A1 | 6/2012 | Kimes | |
| 2012/0145506 A1 | 6/2012 | Samie et al. | |
| 2012/0152683 A1 | 6/2012 | Kimes | |
| 2012/0152687 A1 | 6/2012 | Kimes et al. | |
| 2013/0256078 A1 | 10/2013 | Kimes et al. | |
| 2014/0190785 A1 | 7/2014 | Fetting et al. | |
| 2014/0378266 A1 | 12/2014 | Bockenstette et al. | |
| 2015/0000442 A1 | 1/2015 | Kimes et al. | |
| 2015/0001023 A1 | 1/2015 | Kimes et al. | |
| 2015/0014116 A1 | 1/2015 | Kimes et al. | |
| 2015/0105205 A1 | 4/2015 | Kurosaki et al. | |
| 2015/0211587 A1 | 7/2015 | Kimes et al. | |
| 2016/0047439 A1 | 2/2016 | Kimes et al. | |
| 2016/0129864 A1 | 5/2016 | Essenmacher | |
| 2016/0131205 A1 | 5/2016 | Essenmacher | |
| 2016/0131206 A1 | 5/2016 | Essenmacher | |
| 2016/0160941 A1 | 6/2016 | Green et al. | |
| 2016/0160942 A1 | 6/2016 | Shioiri et al. | |
| 2016/0186818 A1 | 6/2016 | Shioiri et al. | |
| 2016/0223072 A1 | 8/2016 | Miyake | |
| 2016/0230819 A1 | 8/2016 | Shioiri et al. | |
| 2016/0245346 A1 | 8/2016 | Shioiri et al. | |
| 2016/0250917 A1 | 9/2016 | Shibata et al. | |
| 2016/0265605 A1 | 9/2016 | Tomita et al. | |
| 2016/0273595 A1 | 9/2016 | Shioiri et al. | |
| 2016/0290416 A1 | 10/2016 | Hibino | |
| 2016/0339775 A1 | 11/2016 | Shioiri et al. | |
| 2016/0339908 A1 | 11/2016 | Komada et al. | |
| 2016/0341263 A1 | 11/2016 | Shioiri et al. | |
| 2016/0348742 A1 | 12/2016 | Yasui et al. | |
| 2016/0363179 A1 | 12/2016 | Yasui et al. | |
| 2016/0369855 A1 | 12/2016 | Essenmacher | |
| 2016/0375754 A1 | 12/2016 | Kurosaki et al. | |
| 2016/0377126 A1 | 12/2016 | Essenmacher | |
| 2017/0002877 A1 | 1/2017 | Shioiri et al. | |
| 2017/0009820 A1 | 1/2017 | Itagaki et al. | |
| 2017/0037914 A1 | 2/2017 | Hibino et al. | |
| 2017/0050636 A1 | 2/2017 | Shibata et al. | |
| 2017/0059033 A1 | 3/2017 | Shioiri et al. | |
| 2017/0066317 A1 | 3/2017 | Kurosaki et al. | |
| 2017/0073759 A1 | 3/2017 | Arora et al. | |
| 2017/0343061 A1 | 11/2017 | Campton | |
| 2018/0340578 A1 | 11/2018 | Hand | |
| 2018/0340580 A1 | 11/2018 | Hand et al. | |

* cited by examiner

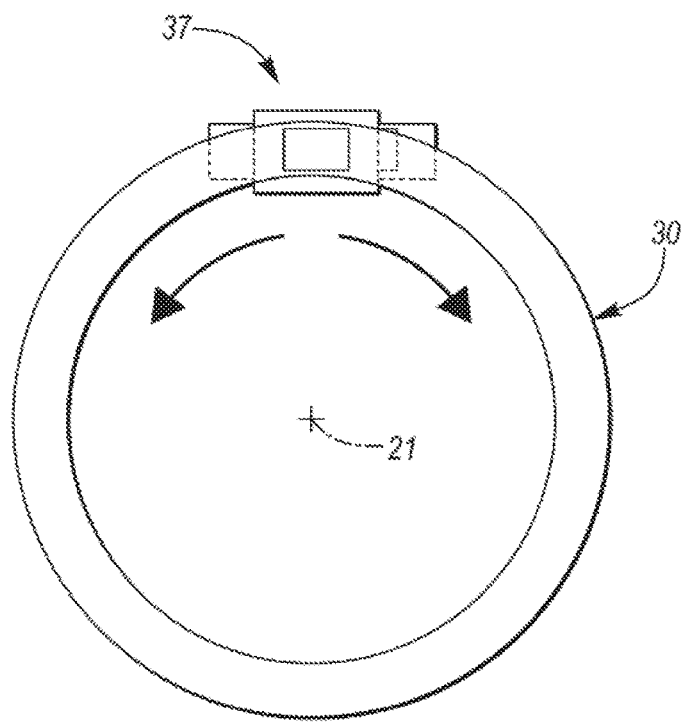
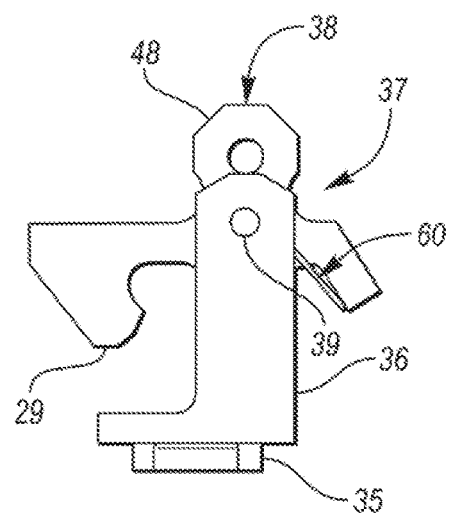
FIG. 3A    FIG. 3B
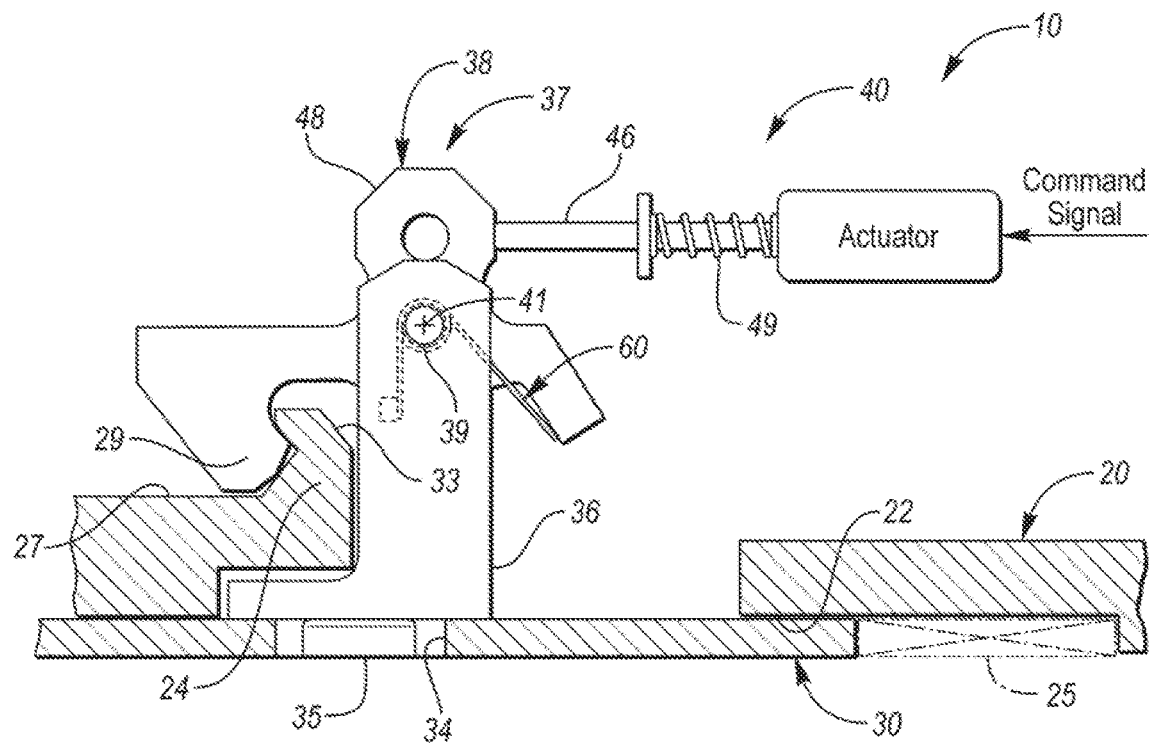
FIG. 4

OVERRUNNING COUPLING AND CONTROL ASSEMBLY AND SYSTEM TO PREVENT THE UNCOMMANDED ENGAGEMENT OF THE ASSEMBLY

CROSS REFERENCE TO RELATED APPLICATION

This application claims the benefit of U.S. provisional application Ser. No. 62/758,727, filed Nov. 12, 2018. This application is a continuation-in-part application of U.S. patent application Ser. No. 15/866,620, filed Jan. 10, 2018, which claims the benefit of U.S. provisional patent application Ser. No. 62/510,856 filed May 25, 2017.

TECHNICAL FILED

This invention generally relates to overrunning coupling and control assemblies and systems to prevent the uncommanded engagement of the assemblies.

Overview

A typical one-way clutch (i.e., OWC) includes a first coupling member, a second coupling member, and a first set of locking members between opposing surfaces of the two coupling members. The one-way clutch is designed to lock in one direction and to allow free rotation in the opposite direction. Two types of one-way clutches often used in vehicular, automatic transmissions include:

Roller type which includes spring-loaded rollers between inner and outer races of the one-way clutch. (Roller type is also used without springs on some applications); and Sprag type which includes asymmetrically shaped wedges located between inner and outer races of the one-way clutch.

One-way clutches typically overrun during engine braking rather than enable engine braking. It is for this reason there is a friction pack at the same transmission node. Selectable dynamic clutches can be used to prevent the over running condition and enable engine braking.

Controllable or selectable one-way clutches (i.e., SOWCs) are a departure from traditional one-way clutch designs. SOWCs often add a second set of struts or locking members in combination with a slide plate. The additional set of locking members plus the slide plate adds multiple functions of the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or actuation mechanism. Movement of this selection mechanism can be between two or more positions which correspond to different operating modes. The selection mechanism is a separate system or assembly that is fixed relative to the OWC by same fastening technique. Such selective mechanism is fixed in a separate and subsequent operation after the OWC has been formed. That subsequent operation requires an additional work station, be it automated or otherwise, which increases, in particular, the manufacturing time and cost of the finished assembly.

In addition, the fact that separate, external parts may be mounted on or near the OWC in a source of quality defects and thus adds to the cost of making such controllable of selectable OWCs which may be significant on a mass production basis. Also, due to dimensional stack-up issues control element or selector plate binding can result especially over long term use.

Driven by a growing demand by industry, governmental regulatory agencies and consumers for durable and inexpensive products that are functionally comparable or superior to prior art products, a continuing need exists for improvement in clutches subjected to difficult service conditions such as extreme temperatures. This is particularly true in the automotive industry where developers and manufactures of clutched for automotive applications must meet a number of competing performance specifications for such articles.

Another problem associated with prior art coupling and control assemblies is that is undesirable to have a relatively large distance between the control element and the activator which moves the control element. A large distance reduces the amount of available space in which the assembly is located. For example, in a vehicle, the amount of space for such assemblies is typically quite limited.

U.S. Pat. No. 5,927,455 discloses a bi-directional overrunning pawl-type clutch. U.S. Pat. No. 6,244,965 discloses a plannar overrunning coupling for transfer of torque. U.S. Pat. No. 6,290,044 discloses a selectable one-way clutch assembly for use in an automatic transmission. U.S. Pat. No. 7,258,214 discloses an overrunning coupling assembly. U.S. Pat. No. 7,344,010 discloses an overrunning coupling assembly. U.S. Pat. No. 7,484,605 discloses an overrunning radial coupling assembly or clutch.

Other related U.S. Patent publications include 2012/0145506; 2011/0192697; 2011/0183806; 2010/0252384; 2009/0194381; 2008/0223681; 2008/0169165; 2008/0169166; 2008/0185253; and the following U.S. Pat. Nos. 8,079,453; 7,992,695; 8,051,959; 7,766,790; 7,743,678; and 7,491,151.

One problem associated with such controllable one-way coupling assemblies is that the one-way clutch may inadvertently change (such as due to parasitic losses) from its overrun position or mode to its locked position or mode especially when the ambient temperature is well below 0° F. due to the highly viscous hydraulic fluid in the one-way clutch. During cold temperature notch plate rotation, high acceleration or shock loading, forces are generated at the selector plate causing the return spring on the selector plate to be overcome and the struts to be uncovered. Such a change could cause the clutch to fail.

U.S. Pat. No. 8,272,488 discloses an overrunning coupling and control assemblies, each of which includes control apparatus having a latching mechanism. Each latching mechanism of an overrunning coupling assembly in a first direction substantially parallel to a shift direction of a control plate of the coupling assembly within a housing slot in a locked condition of the mechanism in a first position of the control plate. A control pressure signal within a bore of the housing changes the condition of the latching mechanism from locked to unlocked to unlock the actuator arm and causes the unlocked actuator are to move along the first direction within the slot and the control element to move along the shift direction to a second position. The control pressure signal also causes a piston which has a groove formed in its outer surface to receive and retain a free end portion of the actuator arm to slide within the bore in the housing against the biasing force of the at least one biasing member. In the absence of a control pressure signal, the at least one biasing member moves the piston and thereby the unlocked actuator arm in a second direction opposite the first direction within the slot and the control element along the shift direction from the second position back to the first position and changes the condition of the latching mechanism from unlocked to locked to lock the actuator arm.

U.S. Published Patent application 2016/0160942; 2016/0273595; 2016/0290416; 2016/0339775; 2016/0341263; 2016/0348742; 2016/0375754; 2017/0002877; 2017/0037914; and 2017/0059033 all discuss the problem of "drag torque" in selectable one-way clutches (i.e. SOWCs).

In one selectable one-way clutch, the pocket plate is fixed to a stationary member, and lubrication oil is applied between the rotary plates. However, the selector plate may be rotated undesirably by a rotation of the notch plate through the lubrication oil. Especially, such drag torque delivered from a shearing force of the oil that is applied to the selector plate is increased with an increase in viscosity of the oil. For example, if a temperature of the oil is extremely low, viscosity of the oil is increased significantly. In this situation, the selector plate may be rotated by the drag torque resulting from rotating the notch plate, and as a result, an actuator arm may be actuated to bring the notch plate into engagement undesirably with the pocket plate. Such erroneous engagement of the selectable one-way clutch may be prevented by enhancing an elastic force of a return spring counteracting the drag torque. In this case, however, a larger actuator for rotating the selector plate may be required to overcome the enhanced spring force, and, consequently, the selectable one-way clutch is enlarged. Alternatively, the clutch would have to be designed so that less unintended force be generated on the selector plate.

Other related SOWCs are described in the following published U.S. Patent applications: 2015/0105205; 2016/0186818; 2016/0230819; 2016/0223072; 2016/0245346; 2016/0250917; 2016/0265605; 2016/0339908; 2016/0363179; 2017/0037914; 2017/0073759; 2017/0050636; and 2017/0066317.

Other U.S. Patent publications which disclose controllable or selectable one-way clutches include U.S. Pat. Nos. 6,193,038; 7,198,587; 7,275,628; 8,087,502; 8,196,724; 8,602,187; and 7,464,801; and U.S. Publication Application Nos: 2007/0278061; 2008/0000747; 2008/0110715; 2009/0159391; 2009/0211863; 2010/0230226; 2014/0190785; 2014/0378266; 2016/0129864; 2016/0160941; 2016/0131206; 2016/0131205; 2016/0369855; and 2016/0377126.

Despite the above, a need exits to provide non-hydraulic clutch disengagement under load, especially during extremely low startup temperature (i.e. 0.0° F. or lower) while conserving space in an automatic transmission environment.

Other U.S. Patent documents related to the present application include: U.S. Pat. Nos. 2,947,537; 2,959,062; 4,050,560; 4,340,133; 4,651,847; 6,607,292; 6,905,009; 7,942,781; 8,061,496; 8,286,772; 2004/0238306; 2006/0185957; 2007/0034470; 2009/0255773; 2010/0022342; 2010/0255954; 2011/0177900; 2012/0090952; 2012/0152683, 2012/0152687, 2012/0145505; 2012/0152687; 2012/0152683; 2015/0001023; 2015/0000442; 2015/0014116; 2015/0211587; 2016/0047439; 2018/0340578 and 2018/0340580.

For purposes of this application, the term "coupling" should be interpreted to include clutches or brakes wherein one of the plates is drivably connected to a torque delivery element of a transmission and the other plate is anchored and held stationary with respect to a transmission housing. The terms "coupling", "clutch" and "brake" may be used interchangeably.

SUMMARY

An object of at least one embodiment of the present invention is to provide an overrunning coupling and control assembly and control system for use therein wherein a mechanism is provided to prevent uncommanded engagement of the assembly especially at cold operating temperatures, high acceleration or shock loading.

In carrying out the above object and other objects of at least one embodiment of the present invention, a system for controlling the operating mode of an overrunning coupling assembly including first and second coupling members having first and second coupling faces, respectively, in close-spaced opposition with one another is provided. At least one of the coupling members is mounted for rotation about a rotary axis. The system includes a control member mounted for controlled shifting movement between the coupling faces. A bi-directional actuator assembly includes an actuator arm having an output member coupled to the control member for selective, small-displacement, control member shifting movement relative to the second coupling member between a first position which corresponds to a first operating mode of the coupling assembly and a second position which corresponds to a second operating mode of the coupling assembly in response to an actuator command signal. The actuator arm also has a one-way locking member pivotally connected to the output member for movement between a disengaged position in which the control member is permitted to shift relative to the second coupling member and an engaged position between the locking member and a locking member-engaging portion of the second coupling member to lock the control member and the second coupling member together to prevent the control member from inadvertently shifting in a first direction relative to the second coupling member in the absence of the actuator command signal received by the actuator assembly.

The control member may be a control or selector plate rotatable about the axis between different angular positions.

The coupling assembly may be a clutch assembly, the coupling members may be clutch members and the coupling faces may be clutch faces.

The actuator assembly may include either an electrically-powered device or a hydraulically-powered device connected to the actuator arm for driving the control member in response to an actuator command signal.

The system may further include a biasing member which exerts a biasing force on the locking member to bias the locking member into the engaged position.

The locking member may be spring-biased into the engaged position.

The locking member may be a latching pawl and the output member may be actuator linkage.

The output member may be coupled to the control member via a semi-rigid connection.

The system may further include a biasing member which exerts a biasing force on the control member during the shifting movement.

The locking member-engaging portion may be formed on a face of the second coupling member spaced from the second coupling face.

The device may include a solenoid having an armature configured to move between extended and retracted positions wherein the locking member is connected to the armature so that the locking member is allowed to rotate a predetermined amount before the output member begins to shift the control member.

The clutch assembly may be selectable, one-way clutch assembly wherein the first clutch member may be a notch plate, the second clutch member may be a pocket plate and the control member may be a selector plate rotatable about the axis.

The control member may have a hole formed therein and the output member may have an end portion projecting therefrom. The end portion may have the semi-rigid connection with the hole in the control member.

Further in carrying out the above object and other objects of at least one embodiment of the present invention, an overrunning coupling and control assembly is provided. The assembly includes a coupling subassembly including first and second coupling members having first and second coupling faces, respectively, in close-spaced opposition with one another. At least one of the coupling members is mounted for rotation about a rotary axis and the second coupling member includes a locking member-engaging portion. A control member is mounted for controlled shifting movement between the coupling faces. A bi-directional actuator subassembly includes an actuator arm having an output member coupled to the control member for selective, small-displacement, control member shifting movement relative to the second coupling member between a first position which corresponds to a first operating mode of the coupling subassembly and a second position which corresponds to a second operating mode of the coupling subassembly in response to an actuator command signal. The actuator arm also has a one-way locking member pivotally connected to the output member for movement between a disengaged position in which the control member is permitted to shift relative to the second coupling member and an engaged position between the locking member and the locking member-engaging portion of the second coupling member to lock the control member and the second coupling member together to prevent the control member from inadvertently shifting in a first direction relative to the second coupling member in the absence of the actuator command signal received by the actuator subassembly.

The control member maybe a control or selector plate rotatable about the axis between different angular positions.

The coupling subassembly may be a clutch subassembly, the coupling members may be clutch members and the coupling faces may be clutch faces.

The actuator subassembly may include either an electrically-powered device or a hydraulically-powered device connected to the actuator arm for driving the control member in response to an actuator command signal.

The assembly may further include a biasing member which exerts a biasing force on the locking member to bias the locking member into the engaged position.

The locking member may be spring-biased into the engaged position.

The locking member may be a latching pawl and the output member may be actuator linkage.

The output member may be coupled to the control member via a semi-rigid connection.

The locking member-engaging portion may be formed on a face of the second coupling member spaced from the second coupling face.

The device may include a solenoid having an armature configured to move between extended and retracted positions wherein the locking member may be connected to the armature so that the locking member is allowed to rotate a predetermined amount before the output member begins to shift the control member.

The clutch subassembly may a selectable, one-way clutch subassembly wherein the first clutch member may be a notch plate, the second clutch member maybe a pocket plate and the control member may be a selector plate rotatable about the axis.

The control member may have a hole formed therein and the output member may have an end portion projecting therefrom. The end portion may have the semi-rigid connection with the hole in the control member.

Still further in carrying out the above object and other objects of the present invention, a system for controlling the operating mode of an overrunning coupling assembly including first and second coupling members having first and second coupling faces, respectively, in close-spaced opposition with one another is provided. At least one of the coupling members is mounted for rotation about a rotary axis. The system includes a control member mounted for controlled shifting movement between the coupling faces and a bi-directional actuator assembly including an actuator arm having an output member coupled to the control member for selective, small-displacement, control member shifting movement relative to the second coupling member between a first position which corresponds to a first operating mode of the coupling assembly and a second position which corresponds to a second operating mode of the coupling assembly in response to an actuator command signal. The actuator arm also has a one-way locking member which has a center of gravity and which is pivotally connected to the output member for limited rotation about an axis between a disengaged position in which the control member is permitted to shift relative to the second coupling member and an engaged position between the locking member and a locking member-engaging portion of the second coupling member to lock the control member and the second coupling member together to prevent the control member from inadvertently shifting in a first direction relative to the second coupling member in the absence of the actuator command signal received by the actuator assembly. The center of gravity of the locking member is located below the axis.

BRIEF DESCRIPTION OF THE DRAWINGS

FIG. 3A is a top plan schematic view, showing the orientation and interconnection between a two-piece actuator arm and the control member of FIG. 2 with possible rotation of the control member indicated by arrows;

FIG. 3B is a side elevational view of the two-piece actuator arm of FIG. 3A;

FIG. 4 is a side schematic view, partially broken away and in cross-section, of a latching pawl of the actuator arm of FIG. 3B shown in its engaged position with the pocket plate;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An overrunning coupling and control assembly, generally indicated at 10 in FIG. 4, typically includes a coupling subassembly such as a selectable one-way clutch (SOWC) subassembly. The subassembly includes first and second coupling members having first and second coupling faces, respectively, in closed-spaced opposition with one another.

The first coupling member may be a notch plate (not shown) which is mounted for rotation about a rotary axis 21 of the subassembly and the second coupling member may be a pocket plate, generally indicated at 20, which is either stationary relative to the notch plate or is also mounted for rotation about the axis 21. The pocket plate 20 has a coupling face 22 with pockets 23 which receive locking members or struts as is well known in the art.

Figure 1:
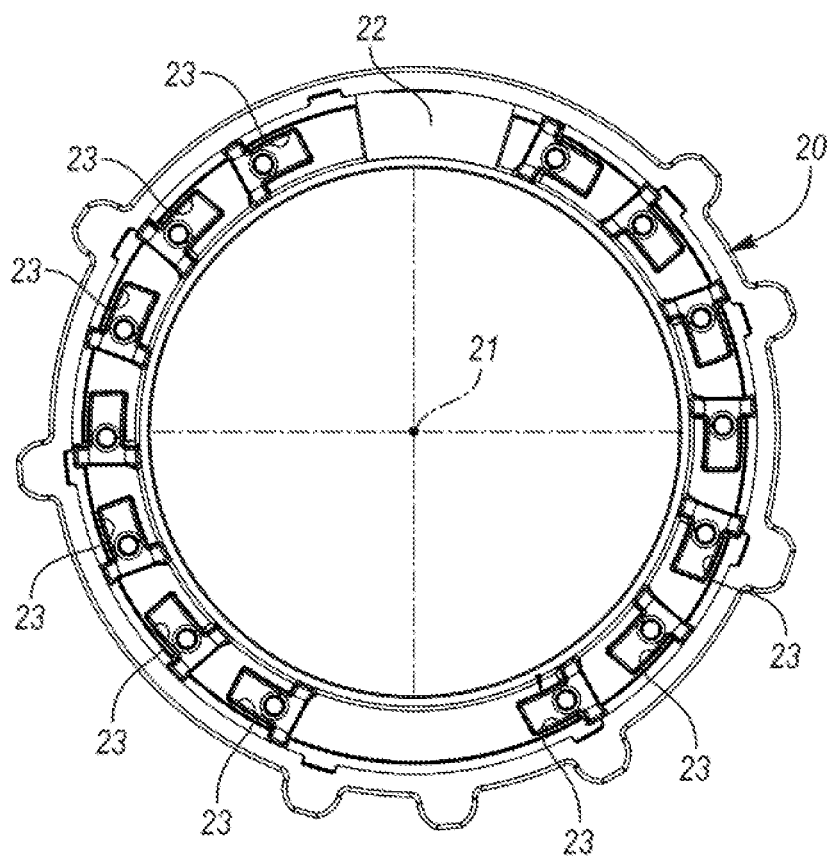
FIG. 1 is a top plan view of a pocket plate having pockets for locking struts.
Figure 2:
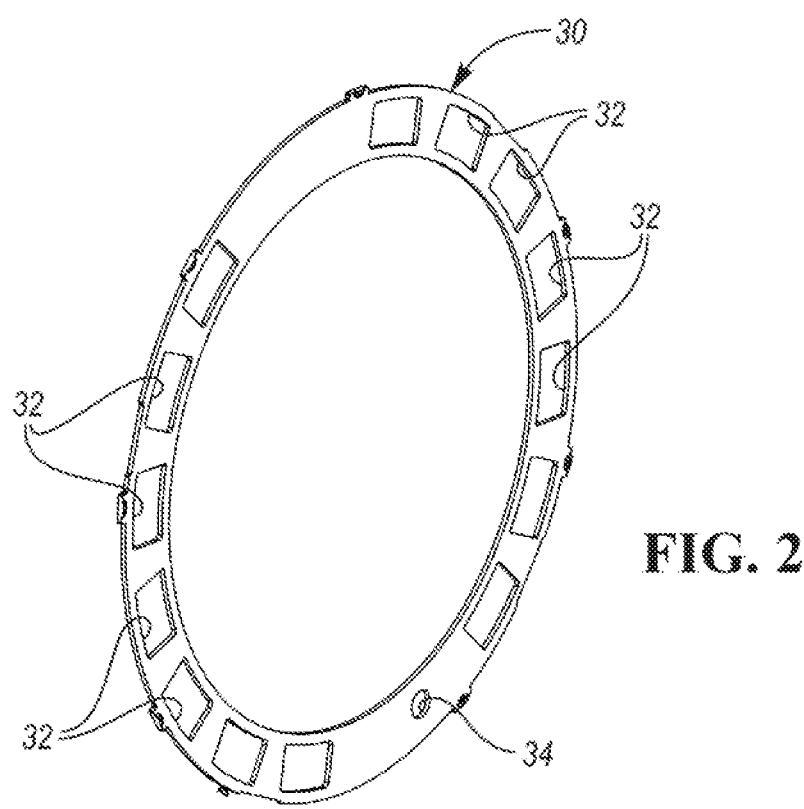
FIG. 2 is a perspective view of a selector plate or control member for use in a coupling and control assembly constructed in accordance with at least one embodiment of the present invention.
Figure 5:
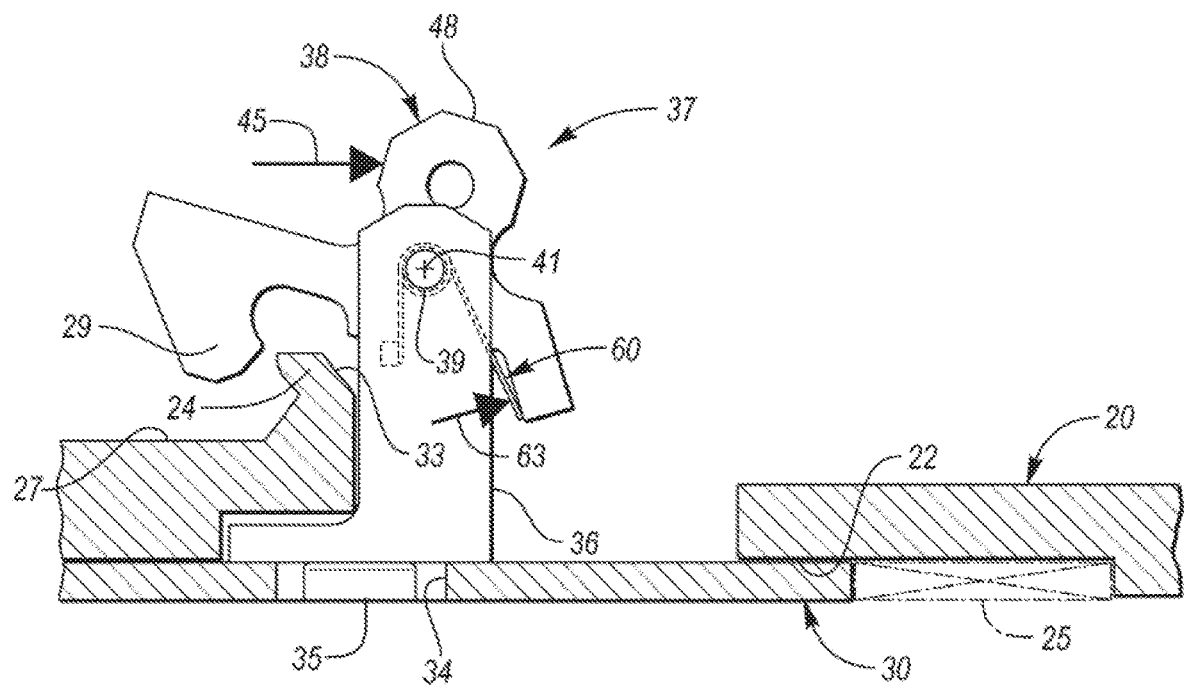
FIG. 5 is a view, similar to the view of FIG. 4, but also showing forces or loads represented by arrows during disengagement of the latching pawl of the actuator arm from the pocket plate.
Figure 6:
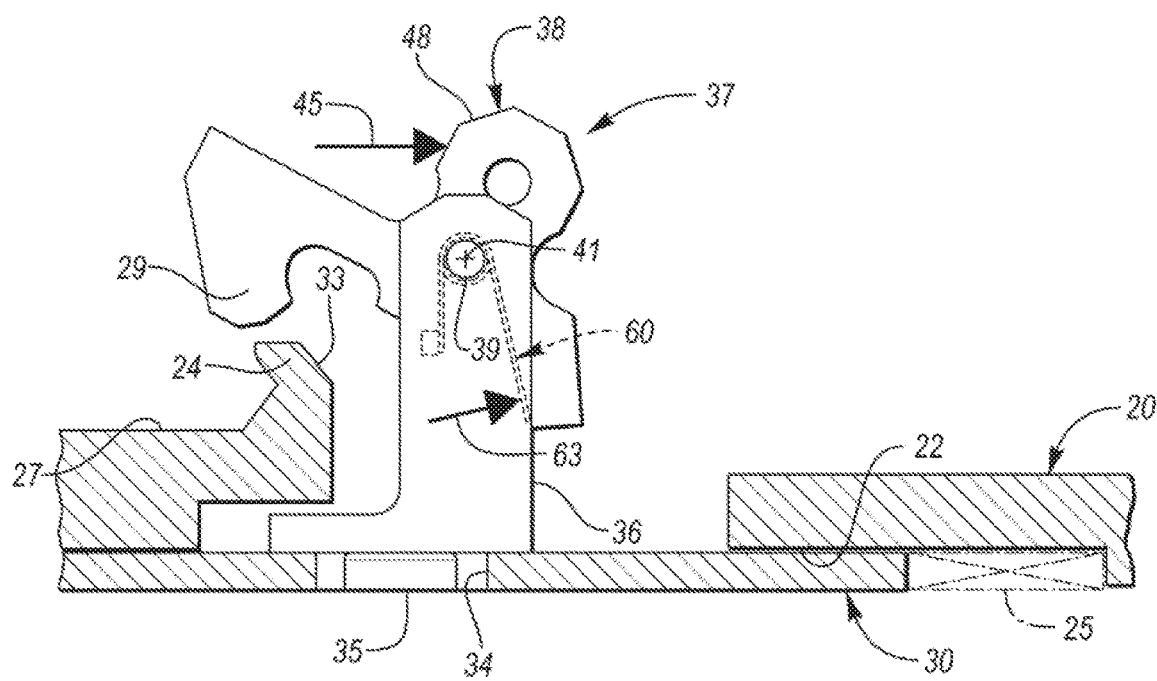
FIG. 6 is a view, similar to the view of FIG. 5, at disengagement and during relative movement between the pocket and selector plates.
Figure 7:
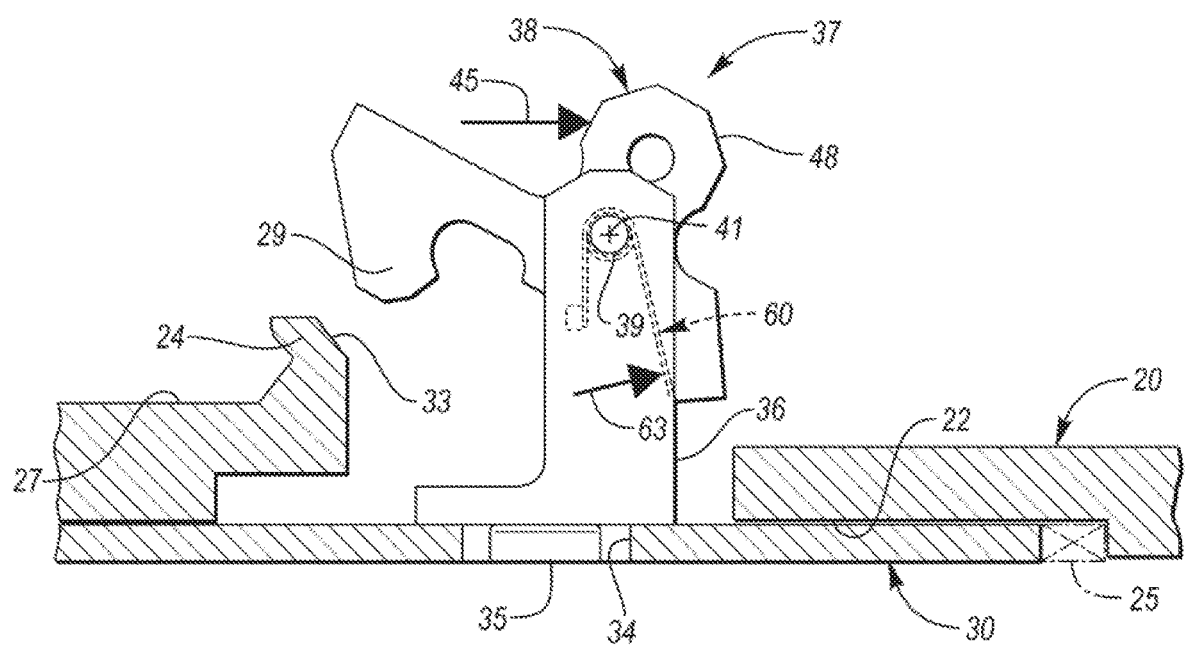
FIG. 7 is a view, similar to the view of FIG. 6, but after further relative movement.
Figure 8:
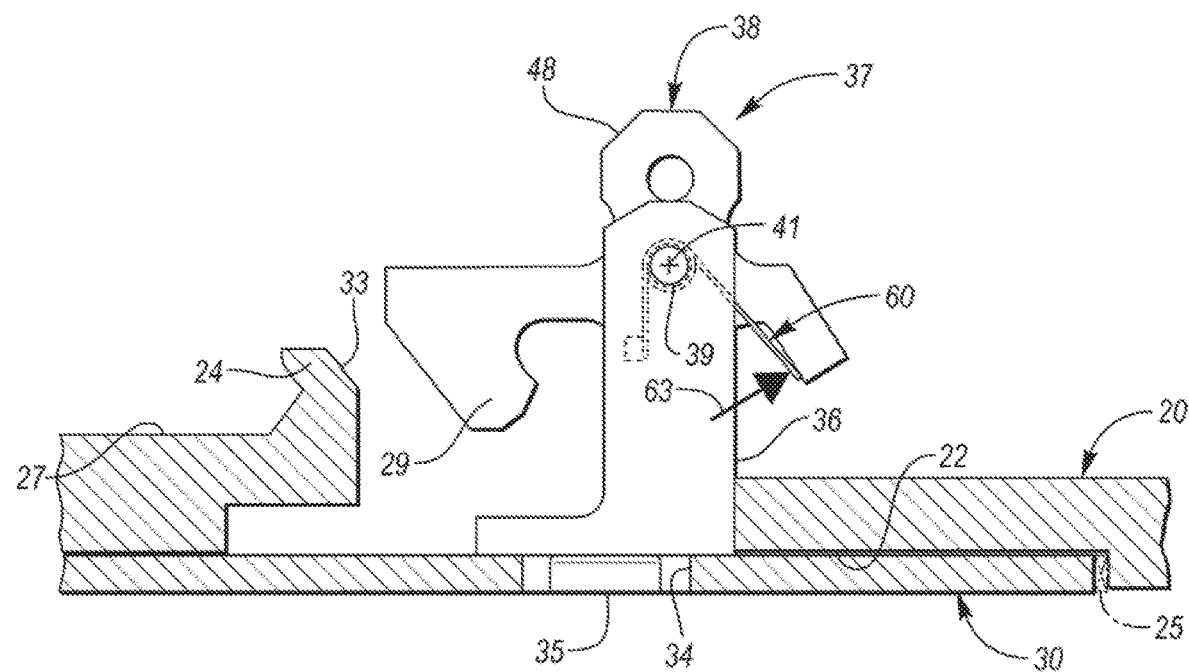
FIG. 8 is a view, similar to the view of FIG. 7, after the relative movement has stopped.

As shown in FIG. 2, the SOWC subassembly also typically includes a control member or selector plate, generally indicated at 30, mounted for controlled shifting or rotational movement between the coupling faces of the notch and pocket plates. A return spring 25 typically biases the selector plate 30 towards an engagement position of FIG. 4. The selector plate 30 includes a plurality of spaced apertures 32 (only shown in FIG. 2) to allow the locking members or struts to extend therethrough. The selector plate 30 also includes a hole 34 which extends therethrough to allow a semi-rigid connection with an end portion 35 of an output member or actuator linkage 36 of an actuator arm, generally indicated at 37. The actuator arm 37 also includes a one-way locking member or latching pawl, generally indicated 38, which is pivotally connected to the output member 36 at a pivot 39 for limited rotation about an axis 41. Preferably, a center of gravity of the locking member 38 is located below the axis 41 as shown in FIG. 4 to facilitate the pivotal movement and latching.

The coupling and control assembly 10 also includes a bi-directional actuator subassembly, generally indicated at 40 in FIG. 4, including the actuator arm 37. The locking member 38 of the actuator arm 37 is preferably connected to an armature or plunger 46 of an actuator or solenoid by collars (not shown) on opposite sides of a head portion 48 of the locking member 38. (Opposite side surfaces of the head portion 48 may be angled to provide the proper motion of the locking member 38 and the output member 36 during linear movement of the armature 46).

A biasing spring 49 may bias the armature 46 for selective, small-displacement, control member shifting or pivotal movement relative to the pocket plate 20 between a first position which corresponds to a first operating mode of the coupling subassembly and a second position which corresponds to a second operating mode of the coupling subassembly in response to an actuator command signal received by the actuator of the subassembly 40.

Figure 9:
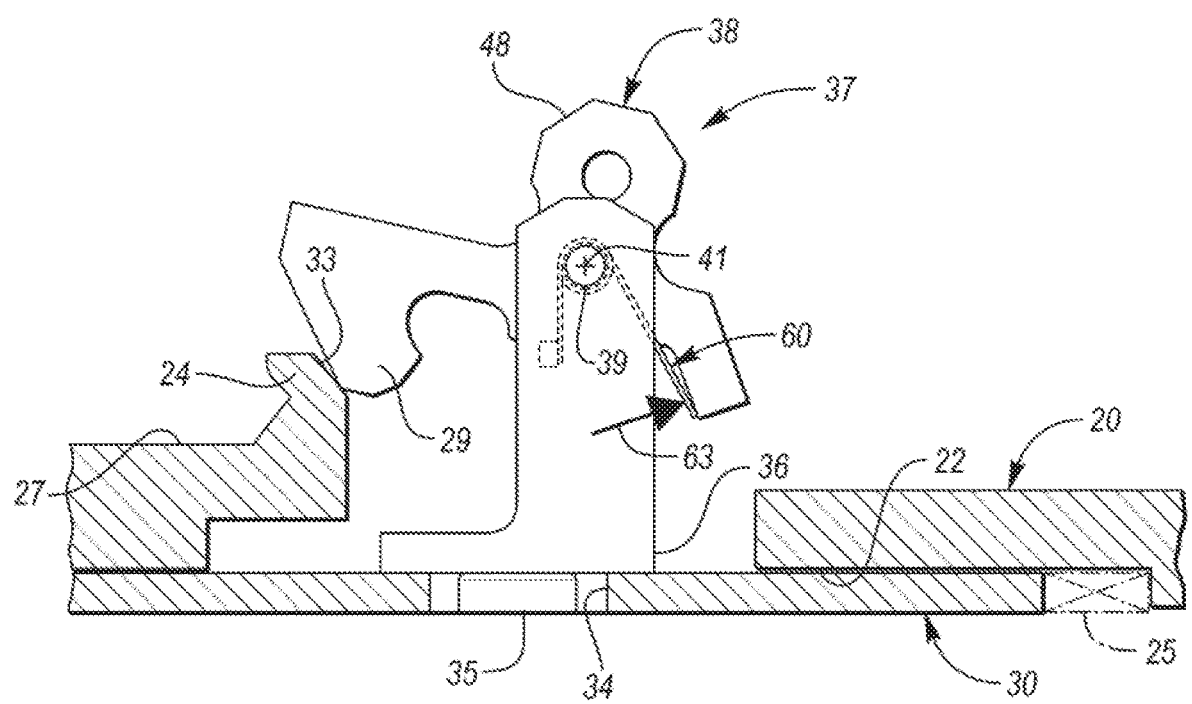
FIG. 9 is a view, similar to the views of FIGS. 4-8, with the latching pawl of the actuator arm traveling back to its engaged position under the bias of a return spring between the pocket and selector plates.
Figure 10:
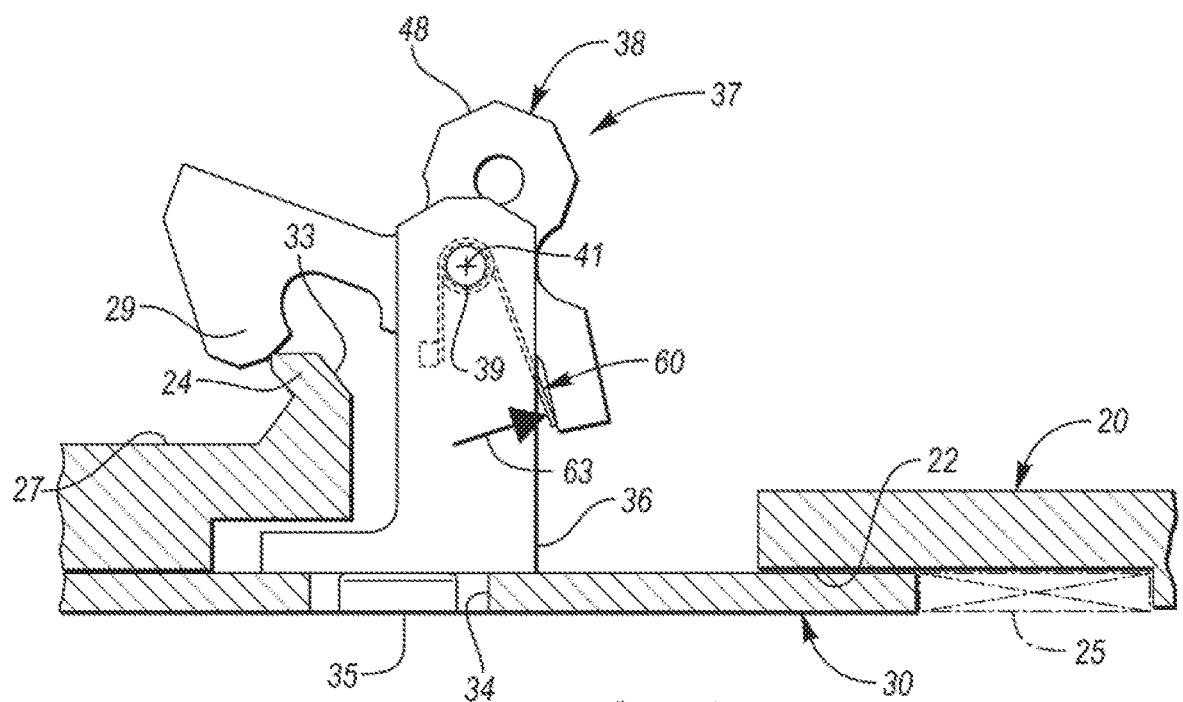
FIG. 10 is a view, similar to the views of FIGS. 4-9, with the latching pawl close to its engaged position of FIG. 4 with the selector plate still biased by the return spring.

The pawl 38 is pivotally connected to the output member 36 via the pivot 39 for movement between a disengaged position (i.e. FIGS. 5-10) in which the selector plate 30 is permitted to shift or rotate relative to the pocket plate 20 and an engaged position (i.e. FIG. 4) in which the selector plate 30 and the pocket plate 20 are locked together to prevent the selector plate 30 from inadvertently shifting or rotating in a first direction about the axis 21 relative to the pocket plate 20 in the absence of the actuator command signal received by the actuator of the subassembly 40. The plate 20 includes a locking portion 24 having a ramped surface 33 which interfaces with a corresponding surface of a locking portion 29 of the pawl 38 to allow the latching action to occur as best shown in FIG. 9.

In general, the assembly 10 may comprise one or more locking members or struts (not shown) disposed between the coupling faces of the coupling members and moveable between the first and second positions. Shifting movement of the selector plate 30 causes the locking struts to change position. The selector plate 30 has at least one opening, and preferably, a plurality of the openings 32, which extends completely therethrough and through which the locking struts extend between the notch and pocket plates.

The actuator of the actuator subassembly 40 may be an electrically-powered or a hydraulically-powered device such as a solenoid for driving the selector plate 30 in response to an actuator command signal from a controller (not shown) which, in turn, may be electrically coupled to a TECU of a vehicle. The solenoid provides a substantially equally distributed load or force as indicated by an arrow 45 in FIGS. 5-7 during covering of the struts by the selector plate 30.

The assembly 10 may further comprise a biasing member such as a torsion spring, generally indicated at 60, which exerts a biasing force as indicated by an arrow 63 in FIGS. 5-10 on the pawl 38 to bias the pawl 38 into the engaged position with the pawl-engaging portion 24 (FIG. 4). One end of the spring 60 is held on the back surface of the output member 36 and a second end of the spring 60 is held on the inner surface of the pawl 38. The load or force (indicated by arrow 63) of the spring 60 is provided between the output member 36 and the pawl 38 during covering of the struts by the selector plate 30. In this way, the pawl 38 is spring-biased into the engaged position with the pawl-engaging portion 24 which is integrally formed on a face 27 of the pocket plate 20 spaced away from the coupling face 22 of the pocket plate 20.

The solenoid of the actuator subassembly 40 typically has the armature 46 configured to linearly move between extended and retracted positions wherein the locking member 38 is connected to the armature 46 so that the locking member 38 is allowed to rotate a predetermined amount before the output member 36 begins to shift the selector plate 30.

The actuation system 40 may be either a hydraulic system or an electric system. In the prior art, each actuation system can be forced to a selector plate "open" orientation if forces get high. These high forces can be from cold oil drag during notch plate rotation. At least one embodiment of the invention creates a lock so that when the actuator is in its "struts-covered" position, a force generated at the selector plate 30 cannot disengage the lock. The lock can only be disengaged by the actuator when commanded to go into its "struts-uncovered" position.

During cold temperature notch plate rotation, forces are generated at the selector plate 30 causing the return spring 49 of the actuation system to be overcome and the struts to be uncovered by selector plate movement. This would cause an engagement of the struts with the notch plate when the actuator was not commanded to uncover the struts. At least one embodiment of this invention prevents this from occurring. Without this embodiment, the actuation system would have to be built stronger to prevent the selector plate 30 from moving or shifting when not commanded, or the clutch would have to be designed so that less unintended force would be generated.

During a cold temperature notch plate rotation, high acceleration or shock loading, forces are generated at the selector plate causing the return spring on the selector plate to be overcome and the struts to be uncovered. This would cause an engagement when the actuator was not commanded to uncover the struts. At least one embodiment of the invention prevents this from occurring. Without this embodiment, the actuation system or return springs would have to be built stronger to prevent the selector plate from moving when not commanded, or the clutch would have to be designed so that less unintended force would be generated onto the selector plate.

As described above, the selector plate is controlled by an actuation system, either hydraulic or electric. This actuation system can be overcome and move the selector plate to the struts uncovered orientation if forces get high. These high forces can be from cold oil drag during notch plate rotation, high acceleration, or shock loading of the system. At least one embodiment of this invention creates a latch so that when the actuator is in the struts covered position, a force generated at the selector plate cannot disengage the latch. The latch can only be disengaged by the actuator when commanded to go into a struts-uncovered position.

This design has a two piece actuator arm, one member connected to the actuation system that acts as the locking member (called latching pawl), and one member connected to the selector plate (called actuator linkage). These two members are connected to each other and are allowed to pivot to set points in both directions relative to each other. The latching pawl is designed to rotate to a fixed location during both the on and off states and is pinned to the actuator linkage allowing it to pivot in one degree of freedom. The actuator linkage is fixed to the selector plate is a semi-rigid connection.

There is a torsional spring between the actuator linkage and the latching pawl so that the latching pawl can be forced into the lock position during the covering of the struts. The pocket plate has a small ledge to interface with the pawl to allow the latching action to occur. When the actuator commands the struts to be uncovered, the actuation system moves the latching pawl lifting it out of the latch until it reaches its end stop and then both the latching pawl, actuator linkage, and selector plate move together to complete the actuation. When the actuation system commands the struts to be covered, the force holding the latching pawl is removed and the return spring which acts on the selector plate pushes the selector plate to the struts covered-position. During the end of the strut-covered travel the latching pawl rides up a small ramp on the pocket plate and the latching pawl locks into the pocket plate ledge.

This design also works in a dynamic application, meaning both the pocket plate and notch plate can rotate. Although both races can rotate, the design is not affected by centrifugal forces (the latching pawl is in the latching position at all times when the actuation system is not commanded to uncover the struts).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for controlling the operating mode of an overrunning coupling assembly including first and second coupling members having first and second coupling faces, respectively, in close-spaced opposition with one another, at least one of the coupling members being mounted for rotation about a rotary axis, the system comprising:
   a control member mounted for controlled shifting movement between the coupling faces; and
   a bi-directional actuator assembly including an actuator arm having an output member coupled to the control member for selective, small-displacement, control member shifting movement relative to the second coupling member between a first position which corresponds to a first operating mode of the coupling assembly and a second position which corresponds to a second operating mode of the coupling assembly in response to an actuator command signal, wherein the actuator assembly further includes an electrically-powered device directly connected to the actuator arm for driving the control member in response to the actuator command signal, wherein the actuator arm has a one-way locking member pivotally connected to the output member for movement between a disengaged position in which the control member is permitted to shift relative to the second coupling member and an engaged position between the locking member and a locking member-engaging portion of the second coupling member to lock the control member and the second coupling member together to prevent the control member from inadvertently shifting in a first direction relative to the second coupling member in the absence of the actuator command signal received by the actuator assembly, and wherein the locking member is connected to the electrically-powered device so that the locking member is allowed to rotate a predetermined amount before the output member begins to shift the control member.

2. The system as claimed in claim 1, wherein the control member is a control or selector plate rotatable about the rotary axis between different angular positions.

3. The system as claimed in claim 1, wherein the coupling assembly is a clutch assembly, the coupling members are clutch members and the coupling faces are clutch faces.

4. The system as claimed in claim 3, wherein the clutch assembly is a selectable, one-way clutch assembly and wherein the first clutch member is a notch plate, the second clutch member is a pocket plate and the control member is a selector plate rotatable about the rotary axis.

5. The system as claimed in claim 1, wherein the electrically-powered device comprises a solenoid having an armature connected to the locking member and configured to move between extended and retracted positions.

6. The system as claimed in claim 1, further comprising a biasing member which exerts a biasing force on the locking member to bias the locking member into the engaged position.

7. The system as claimed in claim 1, wherein the locking member is spring-biased into the engaged position.

8. The system as claimed in claim 1, wherein the locking member is a latching pawl and the output member is actuator linkage.

9. The system as claimed in claim 1, wherein the output member is coupled to the control member via a semi-rigid connection.

10. The system as claimed in claim 9, wherein the control member has a hole formed therein and the output member has an end portion projecting therefrom, the end portion having the semi-rigid connection with the hole in the control member.

11. The system as claimed in claim 1, further comprising a biasing member which exerts a biasing force on the control member during the shifting movement.

12. The system as claimed in claim 1, wherein the locking member-engaging portion is formed on a face of the second coupling member spaced from the second coupling face.

13. An overrunning coupling and control assembly comprising:
a coupling subassembly including first and second coupling members having first and second coupling faces, respectively, in close-spaced opposition with one another, at least one of the coupling members being mounted for rotation about a rotary axis and the second coupling member including a locking member-engaging portion;
a control member mounted for controlled shifting movement between the coupling faces; and
a bi-directional actuator subassembly including an actuator arm having an output member coupled to the control member for selective, small-displacement, control member shifting movement relative to the second coupling member between a first position which corresponds to a first operating mode of the coupling subassembly and a second position which corresponds to a second operating mode of the coupling subassembly in response to an actuator command signal, wherein the actuator assembly further includes an electrically-powered device directly connected to the actuator arm for driving the control member in response to the actuator command signal, wherein the actuator arm has a one-way locking member pivotally connected to the output member for movement between a disengaged position in which the control member is permitted to shift relative to the second coupling member and an engaged position between the locking member and the locking member-engaging portion of the second coupling member to lock the control member and the second coupling member together to prevent the control member from inadvertently shifting in a first direction relative to the second coupling member in the absence of the actuator command signal received by the actuator subassembly, and wherein the locking member is connected to the electrically-powered device so that the locking member is allowed to rotate a predetermined amount before the output member beings to shift the control member.

14. The assembly as claimed in claim 13, wherein the control member is a control or selector plate rotatable about the rotary axis between different angular positions.

15. The assembly as claimed in claim 13, wherein the coupling subassembly is a clutch subassembly, the coupling members are clutch members and the coupling faces are clutch faces.

16. The assembly as claimed in claim 15, wherein the clutch subassembly is a selectable, one-way clutch subassembly and wherein the first clutch member is a notch plate, the second clutch member is a pocket plate and the control member is a selector plate rotatable about the rotary axis.

17. The assembly as claimed in claim 13, wherein the electrically-powered device comprises a solenoid having an armature connected to the locking member and configured to move between extended and retracted positions.

18. The assembly as claimed in claim 13, further comprising a biasing member which exerts a biasing force on the locking member to bias the locking member into the engaged position.

19. The assembly as claimed in claim 13, wherein the locking member is spring-biased into the engaged position.

20. The assembly as claimed in claim 13, wherein the locking member is a latching pawl and the output member is actuator linkage.

21. The assembly as claimed in claim 13, wherein the output member is coupled to the control member via a semi-rigid connection.

22. The assembly as claimed in claim 21, wherein the control member has a hole formed therein and the output member has an end portion projecting therefrom, the end portion having the semi-rigid connection with the hole in the control member.

23. The assembly as claimed in claim 13, wherein the locking member-engaging portion is formed on a face of the second coupling member spaced from the second coupling face.

24. The assembly as claimed in claim 13, further comprising a biasing member which exerts a biasing force on the control member during the shifting movement.

25. A system for controlling the operating mode of an overrunning coupling assembly including first and second coupling members having first and second coupling faces, respectively, in close-spaced opposition with one another, at least one of the coupling members being mounted for rotation about a rotary axis, the system comprising:
a control member mounted for controlled shifting movement between the coupling faces; and
a bi-directional actuator assembly including an actuator arm having an output member coupled to the control member for selective, small-displacement, control member shifting movement relative to the second coupling member between a first position which corresponds to a first operating mode of the coupling assembly and a second position which corresponds to a second operating mode of the coupling assembly in response to an actuator command signal, wherein the actuator assembly further includes an electrically-powered device directly connected to the actuator arm for driving the control member in response to the actuator command signal, wherein the actuator arm has a one-way locking member which has a center of gravity and which is pivotally connected to the output member for limited rotation about an axis between a disengaged position in which the control member is permitted to shift relative to the second coupling member and an engaged position between the locking member and a locking member-engaging portion of the second coupling member to lock the control member and the second coupling member together to prevent the control member from inadvertently shifting in a first direction relative to the second coupling member in the absence of the actuator command signal received by the actuator assembly, wherein the center of gravity of the locking member is located below the axis, and wherein the locking member is connected to the electrically-powered device so that the locking member is allowed to rotate a predetermined amount before the output member begins to shift the control member.

* * * * *